2 Sheets—Sheet 1.
M. UMSTADTER,
Assignor, by mesne assignments, to THE OLD DOMINION MANUFACTURING CO.
Jacquard Attachment for Embroidering Machines.
No. 9,470. Reissued Nov. 16, 1880.
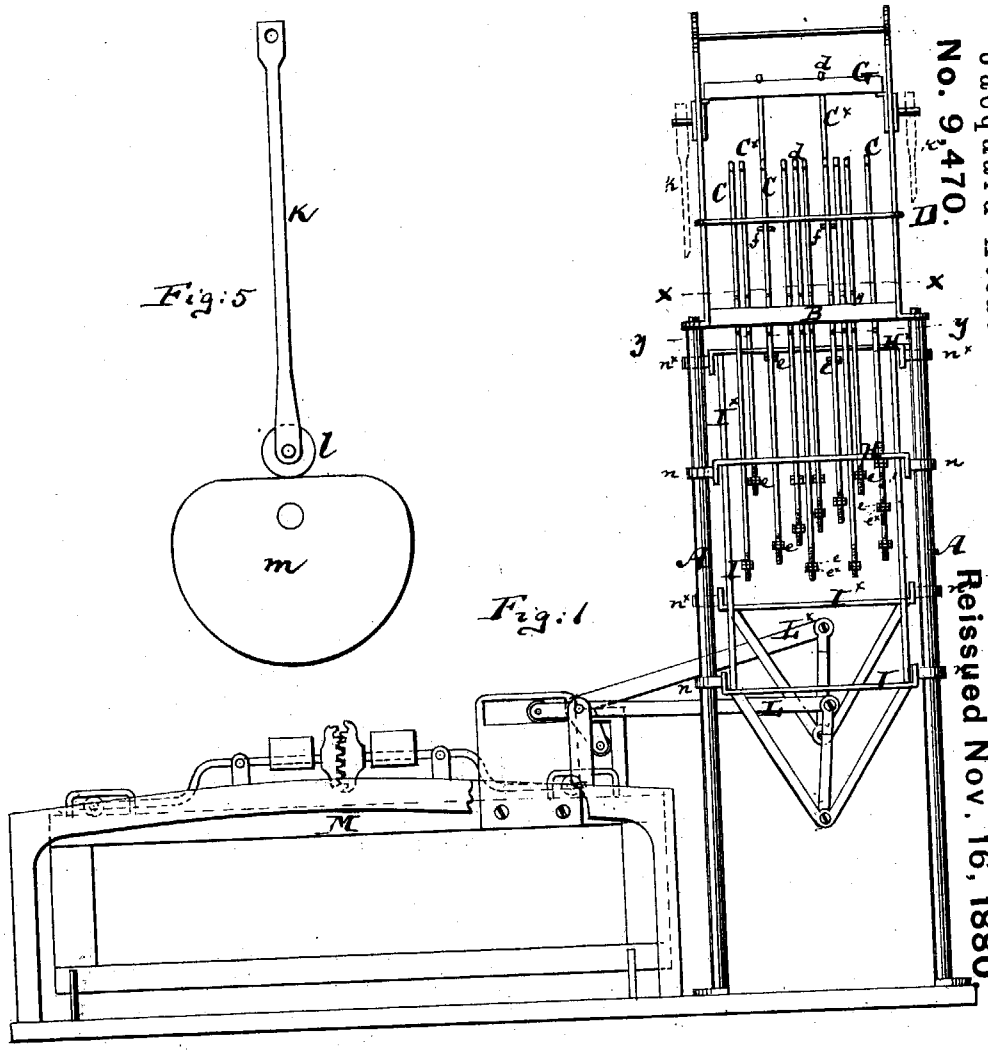
Fig. 1
Fig. 5
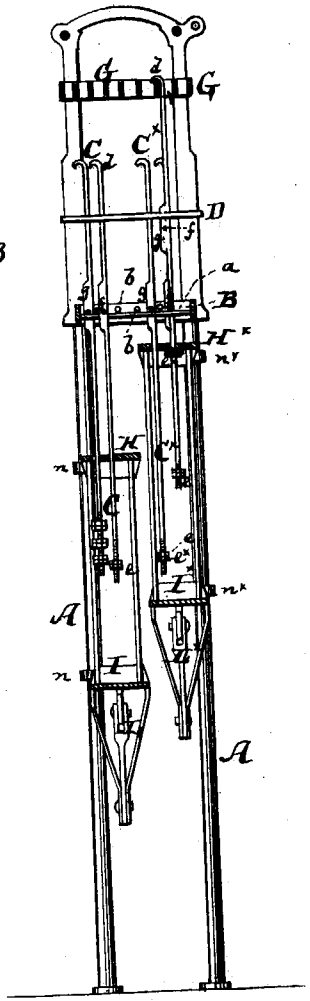
Fig. 3
Witnesses:
John C. Tunbridge
Willy H. G. Schultz
Inventor:
Michael Umstadter
by his attorney
A. v. Briesen
N. PETERS, PHOTO-LITHOGRAPHER, WASHINGTON, D. C.

2 Sheets—Sheet 2.

M. UMSTADTER,

Assignor, by mesne assignments, to THE OLD DOMINION MANUFACTURING CO.

Jacquard Attachment for Embroidering Machines.

No. 9,470. Reissued Nov. 16, 1880.

Witnesses:

John C. Trumbridge

Willy G. S. Schmitz

Inventor:

Michael Umstadter by his attorney

A. v. Briesen

N. PETERS, PHOTO-LITHOGRAPHER, WASHINGTON, D. C.

UNITED STATES PATENT OFFICE.

MICHAEL UMSTADTER, OF NORFOLK, VIRGINIA, ASSIGNOR, BY MESNE ASSIGNMENTS, TO THE OLD DOMINION MANUFACTURING COMPANY, OF NEW YORK, N. Y.

JACQUARD ATTACHMENT FOR EMBROIDERING-MACHINES.

SPECIFICATION forming part of Reissued Letters Patent No. 9,470, dated November 16, 1880.

Original No. 214,209, dated April 8, 1879. Application for reissue filed August 7, 1880.

DIVISION A.

*To all whom it may concern:*

Be it known that I, MICHAEL UMSTADTER, of Norfolk, in the county of Norfolk and State of Virginia, have invented a new and valuable Improvement in Jacquard Attachments for Embroidering-Machines, of which the following is a full clear, and exact description, reference being had to the accompanying drawings, in which—

Figure 2:
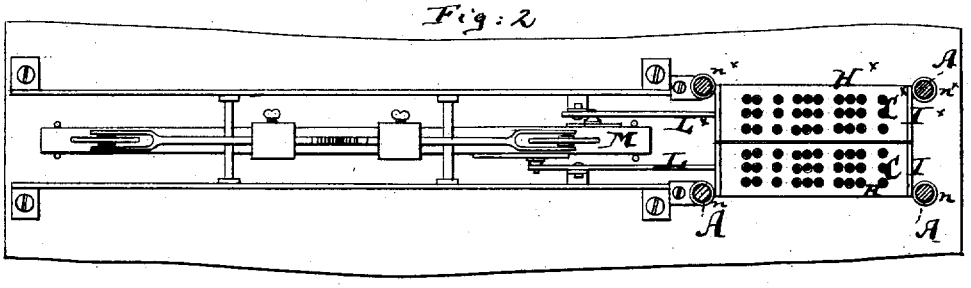
Figure 4:
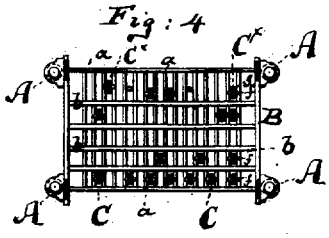
Figure 6:
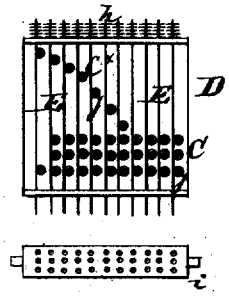
Figure 7:
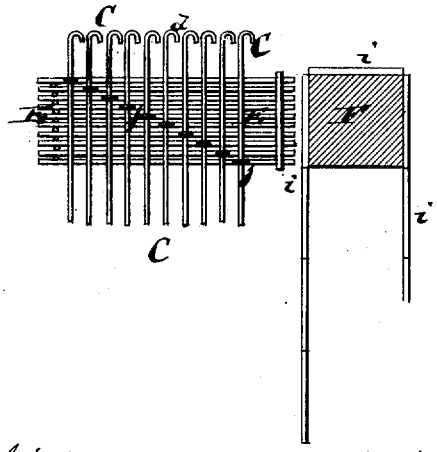

Figure 1 represents a side elevation of my improved Jacquard attachment. Fig. 2 is a horizontal section of the same on the line *y y*, Fig. 1. Fig. 3 is a vertical transverse section of the same without the fabric-frame, which is omitted; Fig. 4, a horizontal section on the line *x x*, Fig. 1. Fig. 5 is a detail side view of pitman *k*, roller *l*, and cam *m*. Figs. 6 and 7 are diagrams, showing the relation of the rods C and C$^{\times}$ with the Jacquard needles, but in these diagrams the relation of the rods C C$^{\times}$ to each other, as shown in the other figures, has not been maintained.

This invention relates to a new Jacquard mechanism for giving motion to the vertical frame of an embroidery-machine. The frame upon which the fabric to be embroidered is stretched is to receive an up-and-down motion and also a longitudinal horizontal motion, so that any desired part of the fabric may be brought opposite any one of the needles that carry the embroidering-thread. This double motion of the frame is obtained by uniting it by levers with two separate vertical frames that are capable of an up-and-down movement. The connection of the embroidery-frame with said two vertically-movable actuating-frames, and its construction, is not part of the invention here to be described or claimed, and is therefore not shown in the drawings, except in Fig. 1, as it forms the subject-matter of a separate division (B) of the Letters Patent of which the present division is one of the reissues.

The present invention relates solely to the means employed for regulating the up-and-down motion of said two vertically-movable frames; and it consists, first, in two independent sets of hooks, so arranged with reference to said two frames and to the other parts of the Jacquard mechanism that the motion of each of said vertical frames will be regulated by means of said hooks.

It also consists in having adjusting-nuts at or near the lower ends of said hooks, whereby the effect of the endwise throw thereof upon the frames that unite with the fabric-frame may be regulated at pleasure.

It also consists in valuable improvements hereinafter more fully shown and described.

In the annexed drawings, the letter A represents the posts of the framing for the Jacquard mechanism, which posts, at or near the upper ends, support a grating, B, (more fully shown in Fig. 4,) which grating has parallel transverse rods *a a* and longitudinal rods *b b*, thus forming cells or spaces through which the hooked rods C C$^{\times}$ of the Jacquard mechanism pass. Each of these hooked rods has a hook, *d*, at the upper end, and an adjustable nut, *e*, at or near the lower end; and it has, moreover, projecting pivots *f*, which support it on the cross-bars of the grate B, as shown in Fig. 4. On these pivots the hooks or hooked rods C and C$^{\times}$ can vibrate in one direction, but the bars *a a* prevent them from vibrating in the other direction, and the hooked rods are, moreover, flattened where they extend in their normal positions through the grating, as shown in Fig. 3 at *g*, said flattened portions preventing the hooked rods from turning in the grating, and from thereby bringing the upper hooks out of the proper direction. The hooked rods above the grating pass through a frame, D, which contains the usual transverse needles E E of the Jacquard mechanism, said needles being, by springs *h*, pushed against or through the cards *i*, that are held and moved by the block F, as is usual in Jacquard mechanism. Each of the needles E, moreover, has a loop or loops, *j*, (see Fig. 6,) for embracing one or more of the hooked rods C C$^{\times}$, all these parts being arranged in such manner that when a needle, E, bears against the card *i* it will carry or swing the hooked rod or rods with which it connects on its or their pivots

*f*, so that the upper hooks, *d*, of such rods so moved by the needles will be brought out of reach of the vertically-movable knife-plate G, which moves up and down above the system of hooked rods, taking up those rods that are not moved by the card, there being, of course, one such knife-plate above each row of hooked rods, as indicated in Fig. 3. The knife-plate frame G carries pitmen *k*, of which each has at its lower end an anti-friction roller, *l*, which rests on a cam, *m*, said cam being revolved by suitable mechanism to alternately raise and lower the knife-plate frame or knife-plate grating G.

The rods C C$^{\times}$ are of various lengths, which are, moreover, determined, as far as their operative lengths are concerned, by adjusting the nuts *e* to the proper distance from the respective hooks *d*. There are two independent sets, C and C$^{\times}$, of these hooked rods, which pass respectively through perforated plates H and H$^{\times}$, that are shown more fully in Fig. 2, and that are part of the vertically-reciprocating separated frames referred to in the introductory part of this specification. The rods C pass through the plate H, and the rods C$^{\times}$ pass through the plate H$^{\times}$. The nuts *e* are on the rods below said two plates, H and H$^{\times}$. The plate H is part of a vertically-movable frame, I, which is properly guided by embracing-eyes *n* on the posts A of the frame, so as to be capable simply of a vertically-reciprocating motion. The plate H$^{\times}$ is part of the frame I$^{\times}$, which, likewise, is joined to the frame A by eyes *n*$^{\times}$, so as likewise to be capable of separate and distinct vertically-reciprocating movement alongside of the frame I, but independently thereof.

As to the nuts *e*, I prefer to secure their adjustment by means of second lower nuts, *e*$^{\times}$, but I do not wish to be understood as limiting myself to any precise mode of attaining this adjustment of the operative length of each hooked rod.

The frame I connects with a lever, L, and the frame I$^{\times}$ connects with an elbow-lever, L$^{\times}$, which said two levers connect with the vertical embroidering-frame M, (see Fig. 1,) upon which the fabric to be embroidered is stretched.

The manner in which the levers L and L$^{\times}$ affect the motion of the suspended frame M forms the subject of a separate patent or division of this reissue, and need not be further referred to herein. Suffice it to say that by raising or lowering the frame I the frame M is lowered or raised through the lever L, the end of which engages with a horizontally-slotted projection of frame M; and that by raising or lowering the frame I$^{\times}$ the frame M is moved endwise horizontally by the elbow-lever L$^{\times}$, which connects with a vertically-slotted projection of said frame, so as to move it horizontally, these movements being absolutely independent of each other in view of the independent motion imparted to each of the frames I and I$^{\times}$.

The operation of the mechanism is as follows: The design having been properly drawn or made, and it having been ascertained which of the intersecting points will form the desired pattern, the cards *i* are punched so that the needles E will be moved in the desired succession to allow the hooks C and C$^{\times}$ to be taken up and lifted by the knife-plates in proper order. As the knife-plate ascends the frames I and I$^{\times}$, having the perforated plates H and H$^{\times}$, remain stationary until the nuts upon those of the hooked rods that are engaged with the knife-plates strike against the plates H H$^{\times}$, whereupon the further elevation of said hooked rods will lift said plates H and H$^{\times}$ each according to the length or position of the nut on the particular lifting-rod C or C$^{\times}$ that affects it. This being done the knife-plate descends, another card allows other hooks to become engaged with it, and the result above described is reproduced upon a second part or point of the fabric.

It will thus be seen that I attain complete control over the movements of the two frames I I$^{\times}$ by means of the adjustable rods C C$^{\times}$, in connection with a single system of needles, E, and single frame carrying knife-plates, and with a single set of cards.

I do not confine myself to the specific device shown for giving motion to the knife-plate frame G.

I claim—

1. The reciprocating knife-plate frame G, in combination with means for moving it up and down, and with two sets of hooked rods, C C$^{\times}$, and with two frames, I I$^{\times}$, and with the Jacquard needles E, for vibrating the hooked rods, and Jacquard cards, for regulating the position of the needles, all arranged for operation as has been described.

2. The hooked rod C, adapted for use in a Jacquard mechanism, and provided with the adjustable lower nut, *e*, substantially as described.

3. The hooked rod C, provided with a hook, *d*, at the upper end, an adjustable nut, *e*, near the lower end, and intermediate pivots, *f*, substantially as described.

4. The frame I, constructed with the perforated plate H, and combined with the hooked rods C, that pass through said perforated plate and have nuts *e* below the same, in combination with the needles and knife-plate of a Jacquard mechanism, and with mechanism for moving the knife-plate up and down, and for selecting and moving the needles for operation, as described.

5. The frame I, having perforated plate H, in combination with one set of hooked rods C, and with the frame I$^{\times}$, having perforated plate H$^{\times}$, and other set of hooked rods C$^{\times}$, and with card mechanism for selecting, and knife-plate mechanism for lifting, said rods, substantially as specified.

6. The combination, with the fabric-frame M, independent frame A, and movable knife-plate G, and means for operating the same, of the vertically-movable frames I $I^{\times}$, that are connected with the fabric-frame, the rods C and $C^{\times}$, that are arranged in independent sets hooked at their upper ends, adjustable as to lengths, plates H and $H^{\times}$, and Jacquard needles E, and pattern-cards *i*, substantially as specified.

7. The combination of a Jacquard pattern and needle mechanism and its endwise movable hooks C $C^{\times}$, arranged in two independent sets, and provided with adjustable nuts *e* near their lower ends, with the vertically-movable frames I and $I^{\times}$, intermediate mechanisms L $L^{\times}$, and with the suspended fabric-frame M, one mechanism, L, moving the fabric-frame vertically, and the other, $L^{\times}$, horizontally, substantially as specified.

MICHAEL UMSTADTER.

Witnesses:
CHAS. MYERS,
FRED. D. LOWELL.